United States Patent
Brandstetter et al.

(10) Patent No.: US 12,036,838 B2
(45) Date of Patent: Jul. 16, 2024

(54) HEIGHT-ADJUSTABLE SPRING-DAMPER SYSTEM FOR A VEHICLE

(71) Applicant: Bayerische Motoren Werke Aktiengesellschaft, Munich (DE)

(72) Inventors: Siegfried Brandstetter, Dorfen (DE); Gerhard Forster, Regensburg (DE); Uwe Schatzberger, Buch (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 655 days.

(21) Appl. No.: 17/269,236

(22) PCT Filed: Jul. 2, 2019

(86) PCT No.: PCT/EP2019/067715
§ 371 (c)(1),
(2) Date: Feb. 17, 2021

(87) PCT Pub. No.: WO2020/038636
PCT Pub. Date: Feb. 27, 2020

(65) Prior Publication Data
US 2021/0323370 A1    Oct. 21, 2021

(30) Foreign Application Priority Data
Aug. 21, 2018  (DE) .................... 10 2018 214 041.3

(51) Int. Cl.
*B60G 17/027*  (2006.01)
*B60G 15/06*   (2006.01)

(52) U.S. Cl.
CPC ....... *B60G 17/0272* (2013.01); *B60G 15/062* (2013.01); *B60G 2202/312* (2013.01);
(Continued)

(58) Field of Classification Search
CPC .............. B60G 17/0272; B60G 15/062; B60G 2202/312; B60G 2202/413; B60G 2202/416; B60G 2300/12
See application file for complete search history.

(56) References Cited

U.S. PATENT DOCUMENTS 9,090,141 B2   7/2015  Schmidt et al.
9,272,598 B2   3/2016  Kazmirski et al.
(Continued)

FOREIGN PATENT DOCUMENTS

CN   103857544 A    6/2014
CN   107416105 A   12/2017
(Continued)

OTHER PUBLICATIONS

PCT/EP2019/067715, International Search Report dated Oct. 11, 2019 (Three (3) pages).
(Continued)

*Primary Examiner* — Thomas W Irvin
(74) *Attorney, Agent, or Firm* — Crowell & Moring LLP

(57) ABSTRACT

A height-adjustable spring-damper system for a vehicle for setting a ride position and payload compensation of the vehicle separately from one another includes a damper cylinder, a supporting spring, a first ring cylinder which has a first ring piston disposed displaceably in the first ring cylinder and which defines a first working chamber with a first working volume, and a second ring cylinder which has a second ring piston disposed displaceably in the second ring cylinder and which defines a second working chamber with a second working volume.

8 Claims, 4 Drawing Sheets

(52) U.S. Cl.
CPC .. *B60G 2202/413* (2013.01); *B60G 2202/416* (2013.01); *B60G 2300/12* (2013.01)

(56) References Cited

U.S. PATENT DOCUMENTS

| | | | | |
|---|---|---|---|---|
| 10,919,597 | B2* | 2/2021 | Murakami | B60G 17/015 |
| 11,472,248 | B2* | 10/2022 | Mages | B60G 15/062 |
| 11,794,546 | B1* | 10/2023 | Son | B60G 17/0272 |
| 11,820,186 | B2* | 11/2023 | Gerlin | B60G 17/0152 |
| 2018/0215230 | A1* | 8/2018 | Mochizuki | B60G 17/0272 |
| 2019/0105958 | A1* | 4/2019 | Mochizuki | B62K 25/10 |
| 2019/0111994 | A1* | 4/2019 | Mochizuki | B62K 25/283 |
| 2019/0225297 | A1* | 7/2019 | Mochizuki | F16F 9/46 |
| 2020/0216139 | A1* | 7/2020 | Murakami | F16F 9/46 |

FOREIGN PATENT DOCUMENTS

| | | |
|---|---|---|
| DE | 102 39 140 A1 | 3/2004 |
| DE | 103 53 025 A1 | 6/2005 |
| DE | 10 2005 001 338 A1 | 7/2006 |
| DE | 10 2008 050 682 A1 | 4/2010 |
| DE | 10 2011 084 089 A1 | 4/2013 |
| DE | 10 2012 112 717 A1 | 6/2014 |
| DE | 11 2014 001 904 T5 | 12/2015 |
| DE | 20 2015 106 622 U1 | 4/2016 |
| EP | 1 864 836 A2 | 12/2007 |
| EP | 2 338 777 A1 | 6/2011 |
| EP | 3 225 529 A1 | 10/2017 |
| WO | WO 2017/102569 A1 | 6/2017 |

OTHER PUBLICATIONS

German Search Report issued in German application No. 10 2018 214 041.3 dated Apr. 25, 2019, with Statement of Relevancy (Seven (7) pages).

English-language Chinese Office Action issued in Chinese application No. 201980034431.0 dated Mar. 15, 2023 (Seven (7) pages).

* cited by examiner

HEIGHT-ADJUSTABLE SPRING-DAMPER SYSTEM FOR A VEHICLE

BACKGROUND AND SUMMARY OF THE INVENTION

The invention relates to a height-adjustable spring-damper system for a vehicle for setting a ride position and payload compensation of the vehicle separately from one another, wherein the vehicle is in particular a single-track motor vehicle or a motorcycle.

For vehicles such as for example motorcycles, the level of the vehicle (vehicle level) has a great influence on the ride characteristics and the steering geometry. Both the stability and the handlability (handling) of the vehicle are highly dependent on the vehicle level, wherein the motor vehicles are normally designed for a predetermined target vehicle level.

In many cases, such vehicles make provision for settability of the vehicle level, which makes it possible for the level of the vehicle to be lowered or raised, in order for example to be at the target vehicle level during travel. Here, through the settability of the vehicle level, payload compensation is normally intended to be possible, in order to compensate for a weight, for example as a result of luggage or a passenger (pillion rider), that additionally acts on the vehicle and results in the vehicle level lowering.

Added to this is the fact that provision is made, in particular by vehicles in the higher-priced sector, for additional settability of the vehicle level, in order for the vehicle to be brought into a ride position which is advantageous for the vehicle situation. For example, the vehicle level can be raised to an upper ride position, which normally corresponds to the target vehicle level, in order to gain ground clearance during travel, and/or the vehicle level can be lowered to a lower ride position, in particular during stopping or braking of the vehicle, in order to make it easier for the ground to be reached with the feet by the rider, and thus to provide increased standing stability for the rider. When moving off or from predetermined speeds, the vehicle, by way of the ride position setting, is then raised back to the upper ride position or the target vehicle level.

The prior art has already disclosed a multiplicity of different height-adjustable spring-damper systems for vehicles which are adjustable in height along their longitudinal axis. However, it is normally the case that the systems allow either payload compensation or ride position setting, but not both.

If, with the aid of such a system, both settability of the ride position and payload compensation are to be possible, use is normally made, in the case of already known apparatuses, of a single hydraulic cylinder having a single piston arranged therein, this however leading to several problems. Normally, such a technical cylinder is arranged, in an adjacent manner in the longitudinal direction thereof, on a supporting spring or a damper cylinder of a spring-damper system, with the result that the structural height of the overall system is significantly increased. Furthermore, payload compensation and a dynamic ride position which varies during travel are able to be realized in a reproducible manner only with great difficulty in terms of measurement and control technology. If, for example, the vehicle level is to be lowered during a stopping process of the vehicle, a part of the hydraulic fluid is pumped out of a part of the technical cylinder. During a later process of raising to the previous level, exactly the same quantity of hydraulic fluid has to be pumped back. Simple timing control for the pumping of the hydraulic fluid is not possible since the pressure and thus the flow volume of the fluid pumped out of the technical cylinder is dependent on many different factors, such as for example payload or outside temperature. The measurement and control apparatuses required for achieving a reproducible vehicle level are however expensive and susceptible to faults.

The invention is therefore based on the object of providing a height-adjustable spring-damper system by which the setting of the height of the spring-damper system of a vehicle, for settability of the ride position and for setting of payload compensation of the vehicle, is possible in a reproducible manner and with high repeat accuracy, wherein the height-adjustable spring-damper system is at the same time to be structurally space-saving, inexpensive and robust.

Provided according to the invention is a height-adjustable spring-damper system for a vehicle for setting a ride position of the vehicle and payload compensation separately from one another. The spring-damper system comprises a damper cylinder and a supporting spring. Furthermore, the spring-damper system has a first ring cylinder, which has a first ring piston arranged displaceably therein, and a second ring cylinder, which has a second ring piston arranged displaceably therein. The first ring piston defines in the first ring cylinder a first working chamber with a first working volume, and the second ring piston defines in the second ring cylinder a second working chamber with a second working volume. Furthermore, the first ring cylinder, with the first ring piston, is configured such that, through changing of the first working volume, displacement of the supporting spring and the damper cylinder relative to one another along a longitudinal axis of the damper cylinder and setting of a length of the spring-damper system along the longitudinal axis for setting the ride position of the vehicle are realized. Also, the second ring cylinder, with the second ring piston, is configured such that, through changing of the second working volume, displacement of the supporting spring and the damper cylinder relative to one another along the longitudinal axis of the damper cylinder and setting of the length of the spring-damper system along the longitudinal axis for setting payload compensation of the vehicle are realized.

The height-adjustable spring-damper system is provided in particular at a vehicle rear axle of a motorcycle.

An alternative embodiment provides that the damper cylinder is a guide cylinder which itself has no vibration-damping properties. For example, it is possible in this way for the settability of the ride position and the load compensation to be realized separately from vibration damping, wherein, at a rear axle of the vehicle, provision is then made of a spring-damper system having a damper cylinder with vibration-damping properties and a spring-damper system having a guide cylinder without vibration-damping properties.

In an advantageous embodiment of the invention, it is provided that the supporting spring, the first ring cylinder, the first ring piston, the second ring cylinder and the second ring piston are arranged concentrically about the longitudinal axis of the damper cylinder. The longitudinal axis, moreover, is oriented concentrically with respect to the damper cylinder.

In order for the length of the spring-damper system along the longitudinal axis to be kept small and for a favorable design to be realized as a result, a likewise advantageous embodiment provides that the first ring cylinder and the first ring piston and also the second ring cylinder and the second ring piston are arranged annularly around the damper cylinder. According to embodiment, either the first and second ring cylinders or at least the first or second ring piston are/is positionally fixed with respect to the damper cylinder. For the purpose of preventing an escape of fluid from the ring cylinders or from the first or second working chamber, it is also provided here that the first ring piston is sealed off with respect to the first ring cylinder and to the damper cylinder, and the second ring piston is sealed off with respect to the second ring cylinder and to the damper cylinder. Here, a respective embodiment may also provide that the first ring cylinder is sealed off with respect to the second ring cylinder and/or the second ring cylinder is sealed off with respect to the first ring cylinder. Such sealing is able to be produced for example via sealing rings arranged on the ring pistons. If, for example, the first or second ring cylinder is fixed to the damper cylinder, the sealing may also be produced via a weld seam or the like.

For the components displaceable along the longitudinal axis in each case (first and second ring cylinders or first and second ring pistons), a suitable sliding surface must be provided for guidance along the longitudinal axis. The sliding surface may be formed for example by an outer surface of the damper cylinder, or for example also be a sleeve arranged around the damper cylinder.

For adjustment and control of the first and second ring pistons, or the first and second ring cylinders, and associated changing of the first and second working volumes, an advantageous variant of the spring-damper system moreover comprises a fluid tank, a fluid pump and a pump valve. The fluid pump is configured such that, in a manner dependent on a valve position of the pump valve and a delivery direction of the fluid pump, it pumps a fluid from the fluid tank into the first or second working chamber and also from the first or second working chamber into the fluid tank, and it changes the first working volume and the second working volume. Here, the fluid pump preferably provides two delivery directions between which the fluid pump can be switched, wherein a changing delivery direction can also be realized by a fluid pump with a fixed delivery direction and additional valves.

It is also preferably provided that the pump valve has at least one first and one second valve position. In the first valve position, fluid can be pumped from the first working chamber into the tank or from the tank into the first working chamber. In particular through the use of a check valve, however, it is also possible for the delivery from the first working chamber through the fluid pump into the tank to be blocked, wherein an alternative flow path for the fluid is then provided. In the second valve position, fluid can be pumped from the second working chamber into the tank or from the tank into the second working chamber. Furthermore, provision may also be made of a third valve position, which corresponds to a blocking position in which the fluid flow is blocked by the pump valve.

What is particularly advantageous is lowering to a lower vehicle level that is as rapid as possible. A further embodiment alternative therefore provides a lowering valve for rapid lowering. The lowering valve has a pass-through position and a blocking position, by way of which the fluid is able to be conducted from the first or second working chamber into the fluid tank in a manner bypassing the fluid pump. As a result of the pressure acting on the respective working chamber, the fluid is pushed through the lowering valve directly into the tank. For this purpose, provision may also be made of a check valve which blocks the fluid flow through the fluid pump. Alternatively, however, a fluid flow through the fluid pump may also be possible, with the result that the fluid is able to be conducted from the working chamber into the tank through the lowering valve and the fluid pump.

In particular in an embodiment with a lowering valve and a check valve, it is also advantageous that no blocking position of the pump valve is required, since the pump valve, in one position, already blocks off the second working chamber and a backflow from the first working chamber into the tank through the check valve and a lowering valve which has been switched into its blocking position is also blocked. A combination of check valve and lowering valve thus makes possible rapid lowering or rapid displacement along the longitudinal axis and at the same time replaces a blocking position of the pump valve in which both the first and the second working chamber are blocked in terms of flow.

The spring-damper system may furthermore comprise fluid channels or fluid lines for fluid or flow-related connection of the fluidic components such as fluid tank, fluid pump, pump valve, lowering valve, first and second working chambers and possibly present storage chambers.

For safety reasons, in one advantageous embodiment variant of the spring-damper system, it is provided that the lowering valve has a return spring for spring return and, in a non-actuated state, is moved into the pass-through position under the action of spring return or, in other words, has a pass-through rest position. This ensures that, in the event of failure of the voltage supply or of a fault of the controller, the lowering valve is moved into the pass-through position, the fluid is forced from the working chamber into the tank and the vehicle level lowers to the lower ride position.

An advantageous embodiment of the spring-damper system provides that the first ring cylinder and the second ring cylinder are formed integrally with one another and define a common cylinder chamber in which the first ring piston and the second ring piston are arranged. Preferably, the common cylinder is fixed to the damper cylinder, such that the first and second ring pistons are displaceable in the common cylinder, and with respect to the damper cylinder, along the longitudinal axis of the damper cylinder.

Here, the first and second working chambers defined by the first and second ring pistons in the ring cylinder formed by integral combination are not in direct contact with one another.

In order to delimit the working chambers in such a spring-damper system or limit the displaceability of the ring pistons in the integrally formed ring cylinder, an advantageous variant provides that the respective displaceability of the first ring piston and the second ring piston in the cylinder chamber is limited by piston stops which are formed by the first and/or second ring cylinder or are fixed in their position relative thereto. The piston stops or stops may be formed for example by inner or outer securing rings which are inserted into grooves formed therefor, these being formed for example on an outer surface of the damper cylinder or on an inner surface of the first or second ring cylinder.

A further but likewise advantageous alternative provides that the first ring piston defines in the first ring cylinder a first storage chamber with a first storage volume, and/or the second ring piston defines in the second ring cylinder a second storage chamber with a second storage volume. Furthermore, the first storage chamber and/or the second storage chamber form(s) the fluid tank, wherein a first cylinder volume made up of the first working volume and the first storage volume and a second cylinder volume made up of the second working volume and the second storage volume are in each case constant. In this case, a common fluid tank is replaced by two storage chambers which are fluidically separate from one another. The fluid systems of the first ring cylinder and of the second ring cylinder are thus substantially completely separate in terms of flow, wherein the fluid in both systems is able to be delivered by the fluid pump depending on the pump valve position. Therefore, it is not possible for example for the fluid to flow from the first working volume into the second storage chamber.

A further aspect of the invention, moreover, is directed at a single-track vehicle, in particular a motorcycle, having a spring-damper system according to the invention at a rear axle of the vehicle for setting the ride position of the vehicle and for compensating for a payload acting on the vehicle.

The features disclosed above may be combined as desired provided that this is technically possible and they are not in conflict with one another.

Other advantageous refinements of the invention are identified in the dependent claims or will be presented in more detail below together with the description of the preferred embodiment of the invention on the basis of the figures.

DETAILED DESCRIPTION OF THE DRAWINGS

The figures are schematic by way of example. Identical reference signs in the figures indicate identical functional and/or structural features.

Figure 1:
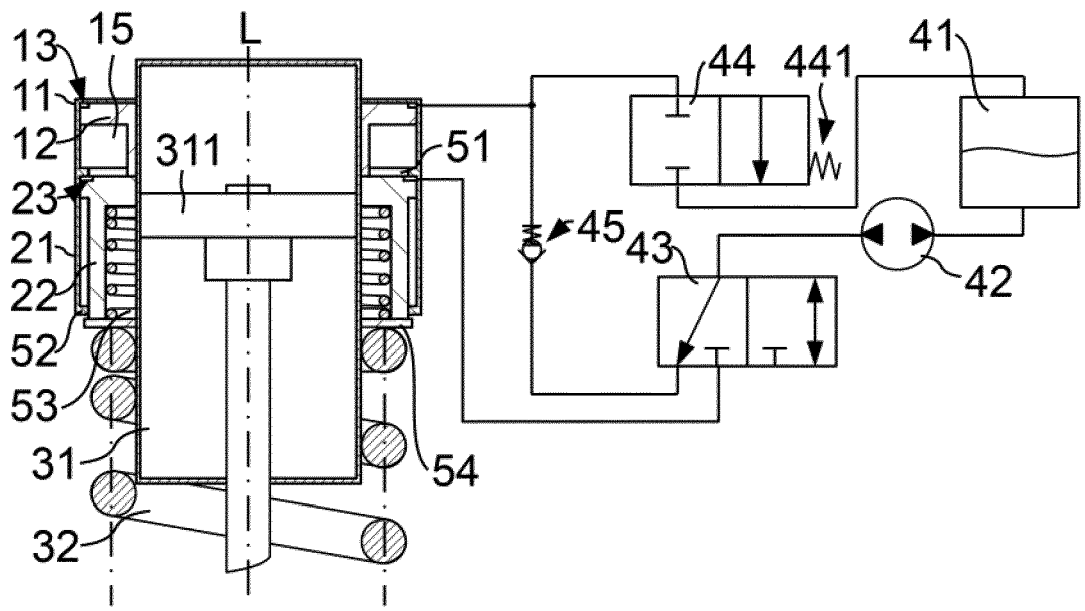
FIG. 1 shows a first height-adjustable spring-damper system in a first position.

FIG. 1 illustrates a first embodiment of a height-adjustable spring-damper system according to the invention for a vehicle. The first and second ring cylinders 11, 21 are formed integrally with one another as a common cylinder and define in the interior of the cylinder a common receiving cavity in which the first and second ring pistons 12, 22 are received. Two annular stops 51, 52 are arranged in the cylinder which is composed of the first and second ring cylinders 11, 21. A first stop 51, which is fixed to the cylinder between the first and second ring pistons 12, 22, limits the displaceability of the first ring piston 12, and a second stop 52, which is arranged on an open end of the cylinder, limits the displaceability of the second ring piston 22. The cylinder composed of the first and second ring cylinders 11, 21 and the first and second ring pistons 12, 22 received therein are in each case of annular form and arranged around a damper cylinder 31 of the spring-damper system. The cylinder composed of the first and second ring cylinders 11, 21 is fixed to the damper cylinder 31, and the first and second ring pistons 12, 22 are displaceable in the cylinder along the damper cylinder 31. The first and second ring pistons 12, 22 are each sealed off with respect to the damper cylinder 31, or to an outer surface of the damper cylinder 31, and with respect to the cylinder composed of the first and second ring cylinders 11, 21, or to an inner surface of the cylinder, by sealing means (not illustrated), with the result that the ring pistons 12, 22 each define a working chamber 13, 23 in the cylinder.

The first ring piston 12 forms a collar which extends parallel to the longitudinal axis L of the damper cylinder 31 and which also bears annularly against the damper cylinder 31. An end side of the collar that faces the supporting spring 32 is formed as a bearing surface or stop surface for the second ring piston 22. From the second ring piston 22, there likewise extends in the direction of the supporting spring 32 a collar, against whose end side which faces the supporting spring 32 the supporting spring 32 bears in a manner supported by a spring disk 54. Moreover, by way of the collar of the second ring piston 22, an auxiliary spring space extending annularly around the damper cylinder 31 is formed by the second ring piston 22, in which auxiliary spring space there is arranged an auxiliary spring 53 which is intended to prevent possible detachment of the supporting spring 32 from the second ring piston in that, in the event of too little pretension of the supporting spring 32, the auxiliary spring 53 pushes the spring disk 54 to the supporting spring 32.

The first ring piston 12 seals off a portion of the receiving cavity of the cylinder and, in this way, forms a first working chamber 13, whose working volume is minimal in FIG. 1. Analogously, the second ring piston 22 also seals off a portion of the receiving cavity of the cylinder and, in this way, forms a second working chamber 23 with a second working volume, which, in the illustrated exemplary embodiment, is arranged between the first and second ring pistons 12, 22. A cavity 15 connected to the second working chamber 23 is formed parallel to the collar of the first ring piston 12, the volume of the cavity not however belonging to the second working volume and also not changing. The cavity 15 may be filled with fluid, however. Alternatively, the collar of the first ring piston could also be of wider form and formed as far as the first stop 51, so that the volume of the cavity 15 is no longer connected to the second working chamber 23. The second working volume of the second working chamber 23 is likewise minimal in FIG. 1.

Since the first and second working chambers 13, 23, or their respective working volumes, are in each case minimal, the length or height of the spring-damper system along the longitudinal axis L is minimal, this corresponding to a lower ride position without payload. The vehicle is therefore set to no payload or to travel without a pillion rider and is at its lower ride level.

For controlling the displacement of the first and second ring pistons 12, 22, a hydraulic system belonging to the height-adjustable spring-damper system and composed of a fluid tank 41, a fluid pump 42, a pump valve 43 and a lowering valve 44 is also illustrated in FIG. 1. The components of the hydraulic system are connected fluidically or in terms of flow to the first and second working chambers 13, 23 via fluid channels.

The lowering valve 44 has, by way of a return spring 441, a spring return position, wherein the lowering valve 44, in the illustrated state, has been actuated and is in its blocking position. Furthermore, the pump valve 43 is in a position in which fluid is able to be delivered by the fluid pump 42 from the fluid tank 41 through the check valve 45 into the first working chamber 13. The connection of the pump valve 43 to the second working chamber 23 is blocked. It is advantageous here that the components situated at the outside in the radial direction with respect to the longitudinal axis L, that is to say the common cylinder composed of the first and second ring cylinders 11, 21, are positionally fixed with respect to the damper cylinder 31. If such a damper system is installed on a vehicle, it is not absolutely necessary for there to be additional encapsulation, in order for example to prevent ingress of dirt between the components or to reduce the risk of injury. Moreover, it is also the case that the connections for the associated hydraulic system will not be moved and are positionally fixed, whereby it is not necessary to provide as fluid channels any flexible hoses, which can be easily damaged.

Figure 2:
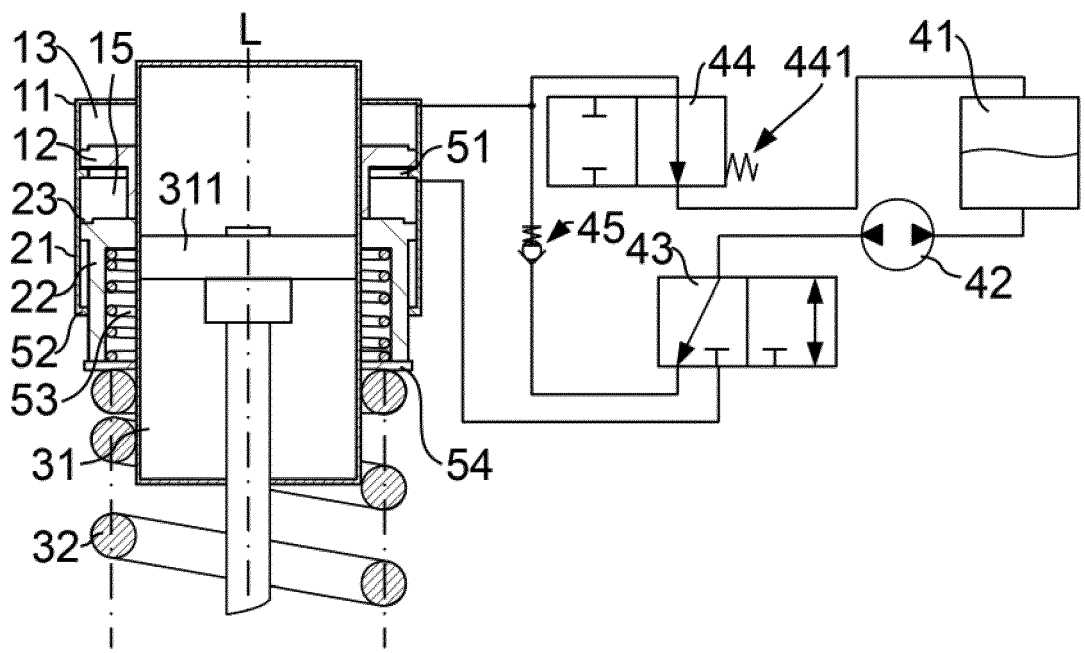
FIG. 2 shows a first height-adjustable spring-damper system in a second position.
Figure 3:
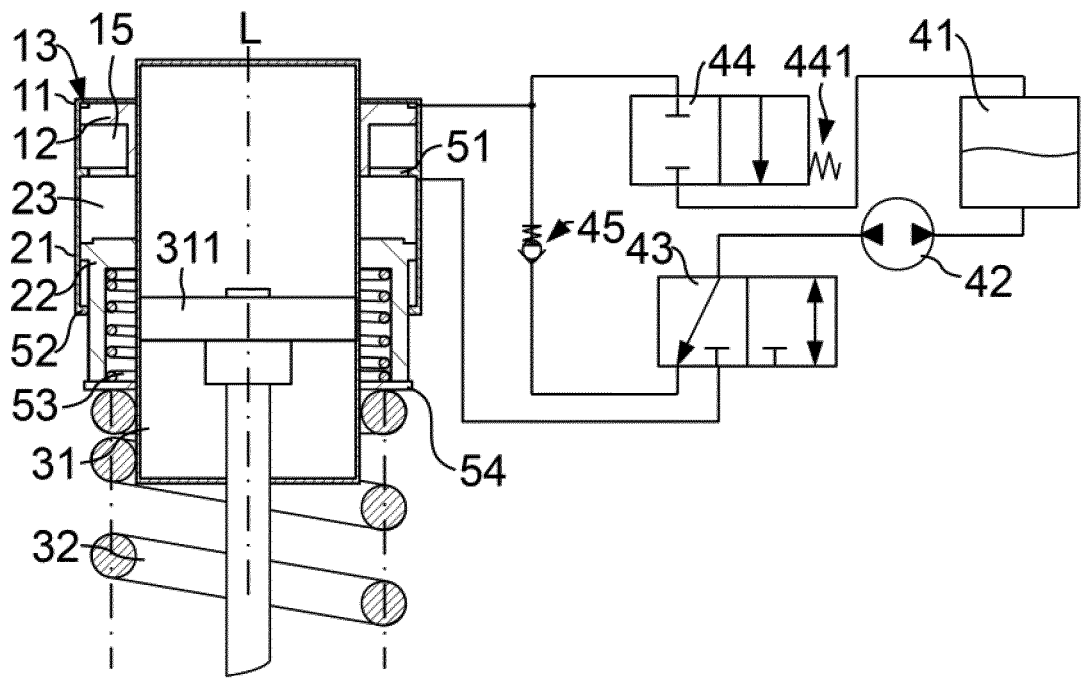
FIG. 3 shows a first height-adjustable spring-damper system in a third position.
Figure 4:
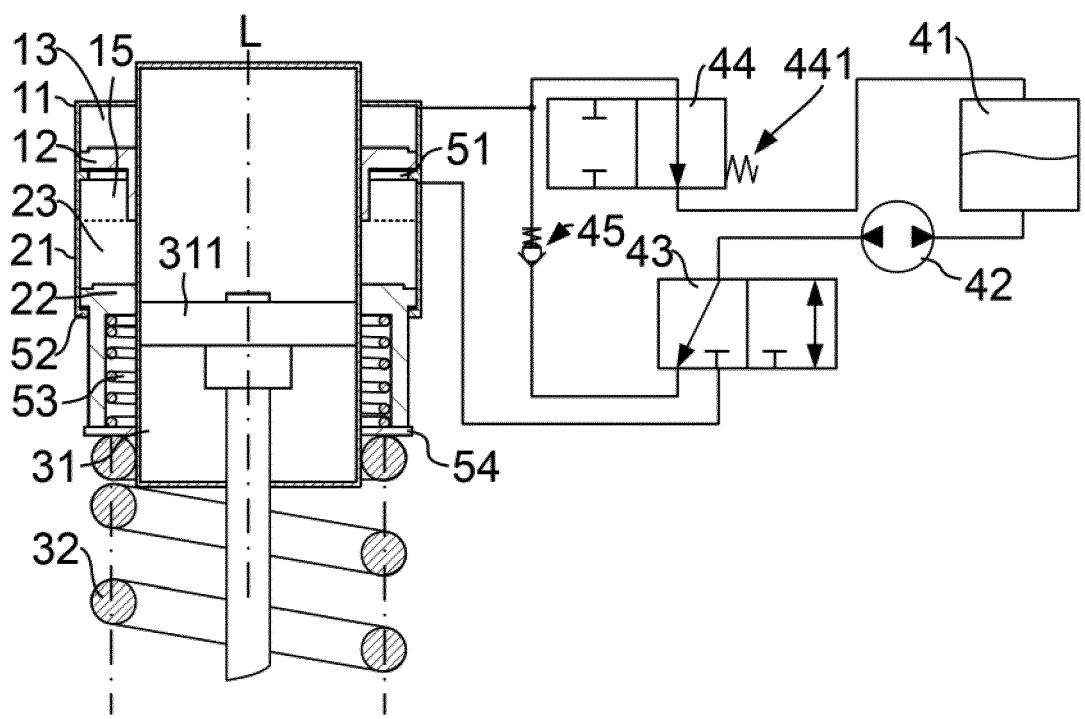
FIG. 4 shows a first height-adjustable spring-damper system in a fourth position.

The spring-damper systems illustrated in FIGS. 2 to 4 correspond substantially to the spring-damper system in FIG. 1. The valve positions, as described with regard to FIG. 1, allow fluid to be pumped by the fluid pump 42 from the fluid tank 41 into the first working chamber 13. Consequently, the first ring piston 12 is displaced along the longitudinal axis L in the direction of the supporting spring 32. During the displacement, the collar of the first ring piston 12 pushes against the second ring piston 22 and displaces the latter downward along the longitudinal axis L toward the supporting spring 32. The second ring piston 22 is pushed in the direction of the spring disk 54 and displaces the latter in the direction of the supporting spring 32, with the result that the supporting spring 32 is moved along the longitudinal axis L. The second working chamber 23 is likewise displaced along the longitudinal axis L toward the supporting spring 32, but does not change its working volume. The cavity 15 being displaced above the second ring piston 22 still corresponds to the cavity 15 parallel to the collar that does not belong to the second working chamber 23. The displacement of the supporting spring 32 results in the damper piston 311 of the damper cylinder 31 being displaced too, and the length of the spring-damper system along the longitudinal axis L is increased. The increase in length results in the vehicle being brought, without payload compensation or without a change to the payload setting, into its upper ride position, which corresponds to the target vehicle level.

In FIG. 2, the lowering valve 44 has been displaced into its pass-through position, which corresponds to its basic or rest position and in which fluid can flow from the first working chamber 13 into the fluid tank 41. The first ring piston 12 is displaced along the longitudinal axis L away from the supporting spring 32 via the second ring piston or via the second working chamber 23 solely by way of forces acting on the damper cylinder 31 and on the supporting spring 32 along the longitudinal axis L, whereby fluid is pressed out of the first working chamber 13 through the lowering valve 44 into the fluid tank 41. In order to block the fluid flow through the pump valve 43 and the fluid pump 42, the check valve 45 is provided, this preventing a fluid flow. In an alternative embodiment, without a check valve 45, the pump 42 can additionally deliver fluid from the first working chamber 13 into the fluid tank 41. As a result of the valve positions of the lowering valve 44 and the pump valve 43 assumed in FIG. 2, the length of the spring-damper system along the longitudinal axis L can be reduced and the vehicle can be lowered again. The raising and lowering is realized here without influencing of payload compensation via the second ring piston 22 or without a change to the second working volume of the second working chamber 23.

The spring-damper system illustrated in FIG. 3 corresponds to the spring-damper system in FIG. 1, and the spring-damper system illustrated in FIG. 4 corresponds to the spring-damper system in FIG. 2. However, in the spring-damper systems in FIGS. 3 and 4, the second ring piston 22 has in each case been displaced along the longitudinal axis L toward the supporting spring 32 for the purpose of compensating for a payload. The second working chamber 23 has a second working volume, which is identical in FIGS. 3 and 4, so that payload compensation by way of the second ring piston 22 remains uninfluenced by the displacement of the first ring piston 12 and by the associated setting of the ride position. In FIG. 4, the delimitation of the second working chamber 23 is indicated by dashed lines, this in each case being covered by a lower edge of the first stop 51 in FIGS. 1 and 3.

Figure 5:
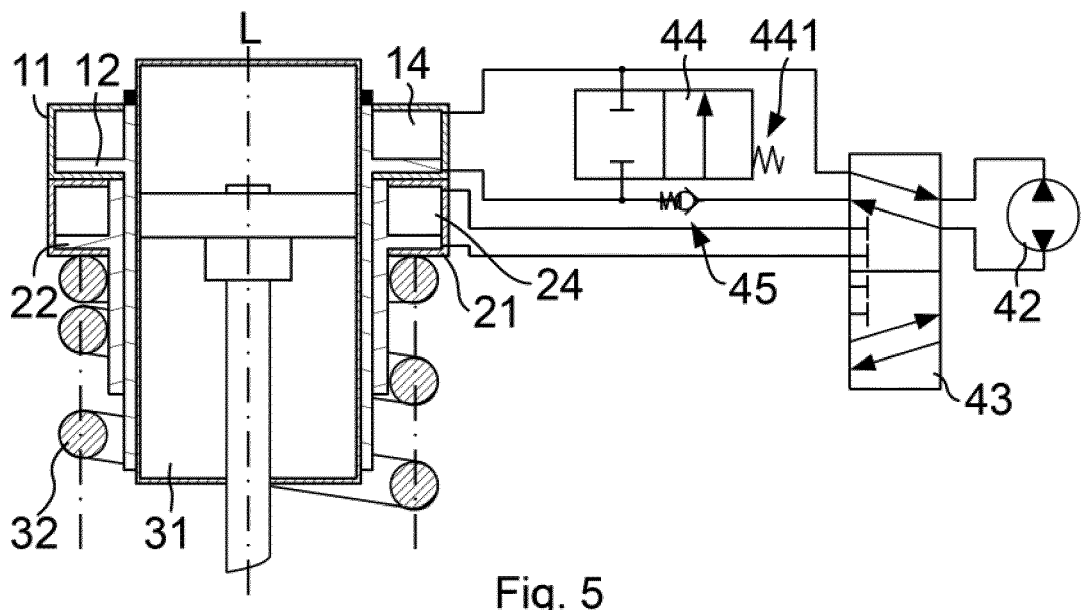
FIG. 5 shows a second height-adjustable spring-damper system in a first position.

FIG. 5 illustrates an embodiment of the spring-damper system that differs from the embodiment variant in FIGS. 1 to 4. The first ring piston 12 is fixed to the damper cylinder 31 and not displaceable with respect thereto. The first ring piston 12 is arranged in a first ring cylinder 11 which is displaceable along the longitudinal axis L. The first ring piston 12 subdivides the interior of the first ring cylinder 11 into a storage chamber 14 and a working chamber 13.

The first ring piston 12 forms a collar which extends parallel to the longitudinal axis L and annularly around the damper cylinder 31 and which surrounds the damper cylinder 31 in a sleeve-like manner. The second ring piston 22 likewise forms a collar, which bears in a radial direction with respect to the longitudinal axis L against the collar of the first ring piston 12 and bears at an end side against the first ring cylinder 11. The second ring piston 22 is displaceable along the longitudinal axis L. The second ring piston 22 is received displaceably in the second ring cylinder 21, which is displaceable along the longitudinal axis L with respect to the second ring piston 22. The second ring piston 22 defines in the second ring cylinder 21 a second storage chamber 24 and a second working chamber 23. In the exemplary embodiment shown, the supporting spring 32 directly adjoins an end side of the second ring cylinder 21.

The sum of the first working volume of the first working chamber 13 and the first storage volume of the first storage chamber 14 is constant, and the sum of the second working volume of the second working chamber 23 and the second storage volume of the second storage chamber 24 is likewise constant. Through changing of the first or second working volume by means of the hydraulic system of the spring-damper system, the respective ring cylinder 11, 21 can be displaced.

The hydraulic system consists in this case of a fluid pump 42, a pump valve 43, a lowering valve 44, a check valve 45 and the fluid channels, which connect the components to the first and second working chambers 13, 23 and to the first and second storage chambers 14, 24. Here, the storage chambers 14, 24 replace the tank, whereby the structural space requirement of the spring-damper system is reduced. The functioning principle is identical to that of the hydraulic system in FIGS. 1 to 4, with an adapted pump valve 43 being used.

The lowering valve 44, in the state shown, is in a blocking position, and the pump valve 43 is in a position in which fluid can be pumped by the fluid pump 42 from the first storage chamber 14 into the first working chamber 13. In FIG. 5, the first and second working chambers 13, 23 each have their minimum volume, whereby the height of the vehicle or the length of the spring-damper arrangement along the longitudinal axis L is minimal.

If fluid is pumped by the fluid pump 42 from the first storage chamber 14 into the first working chamber 13, the first ring cylinder 11 is displaced along the longitudinal axis L, wherein the second ring piston 22 is consequently displaced, via its end surface situated against the first ring cylinder 11, along the longitudinal axis L in the direction of the supporting spring 32. In this case, the payload setting, which is set to a minimum payload in FIG. 5, is not influenced.

Figure 6:
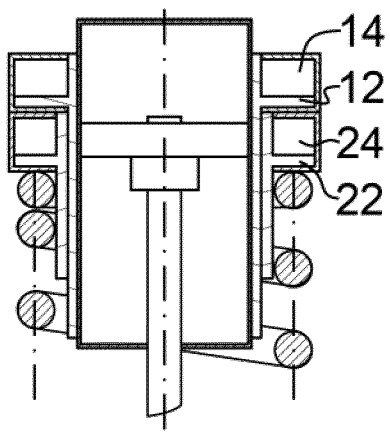
FIG. 6 shows a second height-adjustable spring-damper system in the first position.
Figure 7:
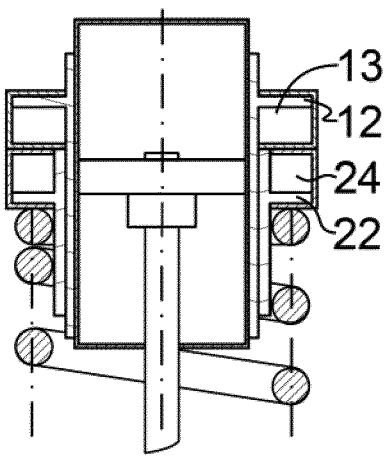
FIG. 7 shows a second height-adjustable spring-damper system in a second position.
Figure 8:
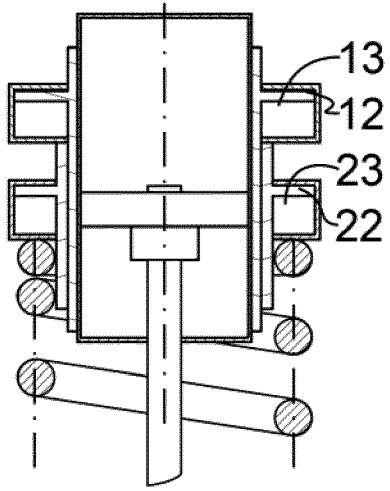
FIG. 8 shows a second height-adjustable spring-damper system in a third position.
Figure 9:
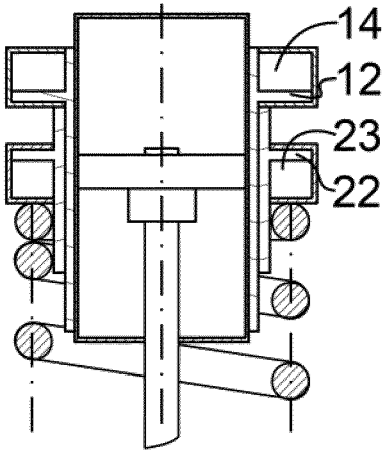
FIG. 9 shows a second height-adjustable spring-damper system in a fourth position.

FIGS. 6 to 9 each show different settings of the spring-damper system from FIG. 5, without the associated hydraulic system. FIG. 6 corresponds to the setting from FIG. 5 and corresponds to a lower ride position without payload. In FIG. 7, the spring-damper system is set to an upper ride position without payload. Here, the first working chamber 13 has its maximum volume, and the second working chamber 23 still has a minimum volume. The state illustrated in FIG. 8 corresponds to the upper ride position with payload. Both the first and the second working chambers 13, 23 have their maximum volume in each case. In FIG. 9, the spring-damper system is set in a lower ride position with payload.

Switching between the upper and lower ride position is in each case possible without influencing of the payload setting by way of the second working chamber 23. Equally, payload compensation by means of the second working chamber 23 can in each case be carried out without influencing of the ride position by means of the first working chamber 13.

Figure 10:
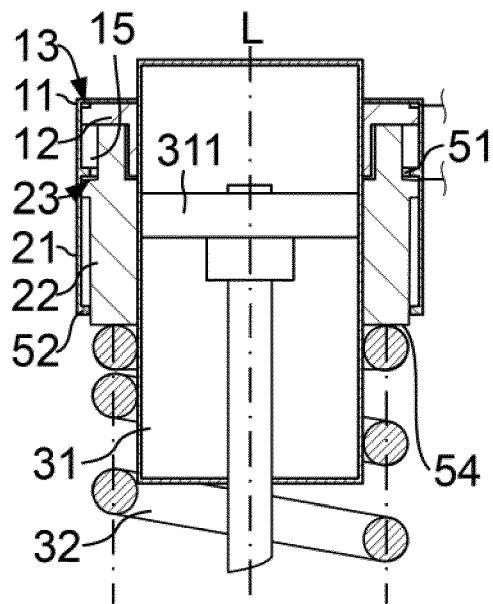
FIG. 10 shows a third height-adjustable spring-damper system.
Figure 11:
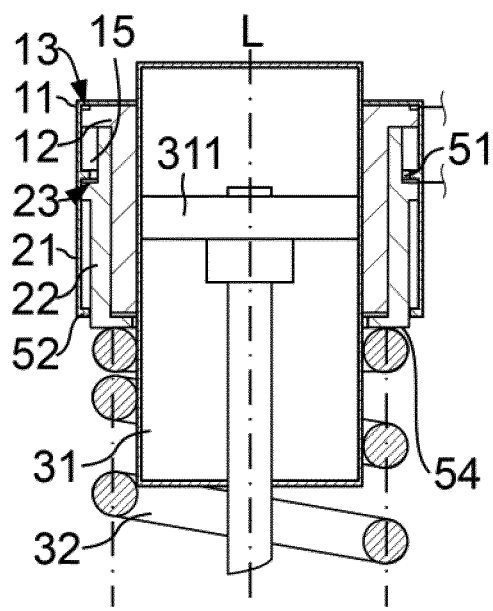
FIG. 11 shows a fourth height-adjustable spring-damper system.

FIGS. 10 and 11 each illustrate a further alternative embodiment, with a common cylinder fixed to the damper cylinder 31 and formed from the first ring cylinder 11 and the second ring cylinder 21. The first ring piston 12 and the second ring piston 22 are each displaceable in the common cylinder along the longitudinal axis L. Both embodiments consequently have a structure and a function that are similar to the structure and the function of the variant shown in FIGS. 1 to 4. The associated hydraulic system may therefore also be identical to the hydraulic system shown in FIGS. 1 to 4, it not however being illustrated in FIGS. 10 and 11. Moreover, in both variants in FIGS. 10 and 11, the spring disk 54 is formed in each case in an integral manner by the second ring piston 22 or by an end surface of the second ring piston 22 that faces the supporting spring 32.

The spring-damper system illustrated in FIG. 10 differs substantially in that the second ring piston 22 forms a collar which extends to the first ring piston 12 and by way of which, in a state in which the second working volume of the second working chamber 23 is minimal, it bears against the first ring piston 12. The collar formed by the first ring piston 12 serves only for guiding the first ring piston 12 on the damper cylinder 31 and no longer displaces the second ring piston 22. Moreover, due to the collar formed by the second ring piston 22, the volume of the cavity 15, which is arranged parallel to the collar of the first ring piston 12 and of the second ring piston 22, is reduced.

The second ring piston 22 as disclosed in FIG. 11 likewise forms a collar extending to the first ring piston 12, wherein it is not the case that the second ring piston 22 bears directly against the damper cylinder 31 and is guided by the latter, but rather the second ring piston bears against a collar which is formed by the first ring piston 12 and which extends parallel to the longitudinal axis L. The guide surface for guidance in the longitudinal direction L of the second ring piston 22 is thus provided by the first ring piston 12, and the guide surface for guidance of the first ring piston 12 in the longitudinal direction L is provided by the damper cylinder 31. The advantage of this embodiment variant is inter alia that both the first ring piston 12 and the second ring piston 22 have a large bearing surface on their respective guide surface for guidance in the longitudinal direction L.

The invention, in terms of its implementation, is not restricted to the preferred embodiments specified above. Rather, a number of variants which make use of the presented solution, even for fundamentally different embodiments, are conceivable.

What is claimed is:

1. A height-adjustable spring-damper system for a vehicle for setting a ride position and payload compensation of the vehicle separately from one another, comprising:
   a damper cylinder;
   a supporting spring;
   a first ring cylinder which has a first ring piston disposed displaceably in the first ring cylinder and which defines a first working chamber with a first working volume; and
   a second ring cylinder which has a second ring piston disposed displaceably in the second ring cylinder and which defines a second working chamber with a second working volume;
   wherein the first ring cylinder and the second ring cylinder are formed integrally with one another such that the first working chamber and the second working chamber form a common cylinder chamber in which the first ring piston and the second ring piston are disposed;
   wherein the first ring cylinder with the first ring piston is configured such that through changing of the first working volume, the supporting spring and the damper cylinder are displaced relative to one another along a longitudinal axis of the damper cylinder and a length of the height-adjustable spring-damper system is set along the longitudinal axis to set the ride position of the vehicle;
   and wherein the second ring cylinder with the second ring piston is configured such that through changing of the second working volume, the supporting spring and the damper cylinder are displaced relative to one another along the longitudinal axis of the damper cylinder and the length of the height-adjustable spring-damper system is set along the longitudinal axis to set the payload compensation of the vehicle.

2. The height-adjustable spring-damper system according to claim 1, wherein the supporting spring, the first ring cylinder, the first ring piston, the second ring cylinder, and the second ring piston are disposed concentrically about the longitudinal axis of the damper cylinder.

3. The height-adjustable spring-damper system according to claim 1, wherein the first ring cylinder, the first ring piston, the second ring cylinder, and the second ring piston are disposed annularly around the damper cylinder, wherein the first ring piston is sealed off with respect to the first ring cylinder and the damper cylinder, and wherein the second ring piston is sealed off with respect to the second ring cylinder and the damper cylinder.

4. The height-adjustable spring-damper system according to claim 1 further comprising:
   a fluid tank;
   a fluid pump; and
   a pump valve;
   wherein the fluid pump is configured such that, dependent on a valve position of the pump valve and a delivery direction of the fluid pump, the fluid pump pumps a fluid from the fluid tank into the first or the second working chamber and also from the first or the second working chamber into the fluid tank, and the fluid pump changes the first working volume and the second working volume.

5. The height-adjustable spring-damper system according to claim 4 further comprising a lowering valve with a pass-through position and a blocking position, wherein via the lowering valve the fluid is conductable from the first or the second working chamber into the fluid tank bypassing the fluid pump.

6. The height-adjustable spring-damper system according to claim 5, wherein the lowering valve has a return spring for spring return and, in a non-actuated state, the lowering valve is movable into the pass-through position under action of the spring return.

7. The height-adjustable spring-damper system according to claim 1, wherein a respective displaceability of the first ring piston and the second ring piston in the common cylinder chamber is limited by piston stops which are formed by the first and/or the second ring cylinder or which are fixed relative to the first and/or the second ring cylinder.

8. A single-track vehicle, comprising:
the height-adjustable spring-damper system according to claim 1 disposed at a rear axle of the single-track vehicle, wherein the height-adjustable spring-damper system sets a ride position of the single-track vehicle and compensates for a payload acting on the single-track vehicle.

* * * * *